(12) United States Patent
Sehgal et al.

(10) Patent No.: US 11,755,375 B2
(45) Date of Patent: Sep. 12, 2023

(54) AGGREGATING HOST MACHINES INTO A SINGLE CLOUD NODE FOR WORKLOADS REQUIRING EXCESSIVE RESOURCES

(71) Applicant: Red Hat, Inc., Raleigh, NC (US)

(72) Inventors: Swati Sehgal, Cork (IE); Marcel Apfelbaum, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/537,037

(22) Filed: Nov. 29, 2021

(65) Prior Publication Data

US 2023/0168943 A1   Jun. 1, 2023

(51) Int. Cl.
   *G06F 9/50*   (2006.01)
   *H04L 67/60*   (2022.01)
   *G06F 9/54*   (2006.01)

(52) U.S. Cl.
   CPC ............ *G06F 9/505* (2013.01); *G06F 9/5077* (2013.01); *H04L 67/60* (2022.05); *G06F 9/54* (2013.01)

(58) Field of Classification Search
   CPC ... G06F 9/50; G06F 9/54; G06F 9/455; G06F 9/505; G06F 9/542; G06F 9/5072; G06F 9/5077; G06F 9/45558; G06F 17/30442; G06F 17/30477; G06F 17/30592; G06F 17/30598; H04L 67/02; H04L 67/60;
   (Continued)

(56) References Cited

U.S. PATENT DOCUMENTS 8,930,543 B2 *   1/2015   Ashok ................. H04L 67/1031
                                                                 709/224
10,708,082 B1 *   7/2020   Bakiaraj ............... H04L 45/586
                         (Continued)

FOREIGN PATENT DOCUMENTS

CN   111309401 A   6/2020
CN   112306631 A   2/2021

OTHER PUBLICATIONS

Zheng, Chao, "A Multi-Tenant Framework for Cloud Container Services," Alibaba Group, Mar. 24, 2021, https://arxiv.org/pdf/2103.13333.pdf.
(Continued)

*Primary Examiner* — James N Fiorillo
(74) *Attorney, Agent, or Firm* — Womble Bond Dickinson (US) LLP

(57) ABSTRACT

A system and method for aggregating host machines into a single cloud node for workloads requiring excessive resources. The method includes providing a plurality of computing devices in association with a cloud service system. The method includes defining an aggregated node of the cloud service system corresponding to at least two computing devices of the plurality of computing devices. The method includes exposing an application programming interface (API) that is indicative of combined resources of the at least two computing devices of the plurality of computing devices. The method includes receiving a query to perform a workload requiring a set of resources that exceed the resources provided by each of the computing devices of the cloud service system. The method includes forwarding, to the aggregated node, the query to cause the at least two computing devices to perform the workload using the combined resources of the least two computing device.

20 Claims, 4 Drawing Sheets

(58) Field of Classification Search
CPC ..... H04L 67/1031; H04L 47/70; H04L 12/24; H04L 12/46; H04L 12/713; H04L 12/735; H04L 411/0273; H04L 69/08
USPC .......................................................... 709/226
See application file for complete search history.

(56) References Cited

U.S. PATENT DOCUMENTS

| | | | |
|---|---|---|---|
| 10,771,283 B2* | 9/2020 | Subbarao | H04L 41/0273 |
| 11,418,589 B1* | 8/2022 | Spiegelman | H04L 67/1095 |
| 2015/0355946 A1* | 12/2015 | Kang | G06F 9/5072 |
| | | | 718/104 |
| 2019/0319918 A1* | 10/2019 | Wing | H04L 63/0281 |
| 2020/0050694 A1* | 2/2020 | Avalani | G06F 16/2455 |
| 2020/0409949 A1* | 12/2020 | Saxena | G06F 9/505 |
| 2021/0011765 A1* | 1/2021 | Doshi | G06F 9/5077 |
| 2021/0014133 A1* | 1/2021 | Maciocco | H04L 41/5009 |
| 2021/0328933 A1* | 10/2021 | Thyagaturu | H04L 47/24 |
| 2021/0365324 A1* | 11/2021 | Wang | G06F 11/3006 |
| 2022/0070139 A1* | 3/2022 | Wing | H04L 67/563 |
| 2022/0156129 A1* | 5/2022 | Li | G06F 9/542 |
| 2022/0283858 A1* | 9/2022 | Regge | G06F 9/5055 |
| 2022/0345483 A1* | 10/2022 | Shua | G06F 21/577 |

OTHER PUBLICATIONS

"Host aggregates," https://docs.openstack.org/nova/latest/admin/aggregates.html.

* cited by examiner

300

```
┌─────────────────────────────────────────────┐
│ providing a plurality of computing devices  │
│ in association with a cloud service system, │
│ wherein each computing device corresponds   │
│ to a respective node of a plurality of      │
│ nodes, each computing device provides       │
│ resources for the cloud service system      │
│                    302                      │
└─────────────────────────────────────────────┘
                      ↓
┌─────────────────────────────────────────────┐
│ defining an aggregated node of the cloud    │
│ service system corresponding to at least    │
│ two computing devices of the plurality of   │
│ computing devices                           │
│                    304                      │
└─────────────────────────────────────────────┘
                      ↓
┌─────────────────────────────────────────────┐
│ exposing, to a scheduler of the cloud       │
│ service system, an application programming  │
│ interface (API) that is indicative of       │
│ combined resources of the at least two      │
│ computing devices of the plurality of       │
│ computing devices                           │
│                    306                      │
└─────────────────────────────────────────────┘
                      ↓
┌─────────────────────────────────────────────┐
│ receiving, by the scheduler responsive to   │
│ receiving the API, a query to perform a     │
│ workload requiring a set of resources that  │
│ exceed the resources provided by each of    │
│ the computing devices of the cloud service  │
│ system                                      │
│                    308                      │
└─────────────────────────────────────────────┘
                      ↓
┌─────────────────────────────────────────────┐
│ forwarding, by the scheduler to the         │
│ aggregated node, the query to cause the at  │
│ least two computing devices to perform the  │
│ workload using the combined resources of    │
│ the least two computing device              │
│                    310                      │
└─────────────────────────────────────────────┘
```

FIG. 3

AGGREGATING HOST MACHINES INTO A SINGLE CLOUD NODE FOR WORKLOADS REQUIRING EXCESSIVE RESOURCES

TECHNICAL FIELD

The present disclosure relates generally to software technology, and more particularly, to systems and methods for aggregating host machines into a single cloud node for workloads requiring excessive resources.

BACKGROUND

Cloud service systems are infrastructure, platforms, or software that are hosted by third-party providers and made available to users through the internet. Cloud services facilitate the flow of user data from front-end clients (e.g. servers, tablets, desktops, laptops—anything on the client's end), through the internet, to the provider's systems, and back. Clients can access cloud services with nothing more than a computer, operating system, and internet connectivity or virtual private network (VPN).

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a flow diagram depicting a method for aggregating host machines into a single cloud node for workloads requiring excessive resources, according to some embodiments.

DETAILED DESCRIPTION

Figure 1:
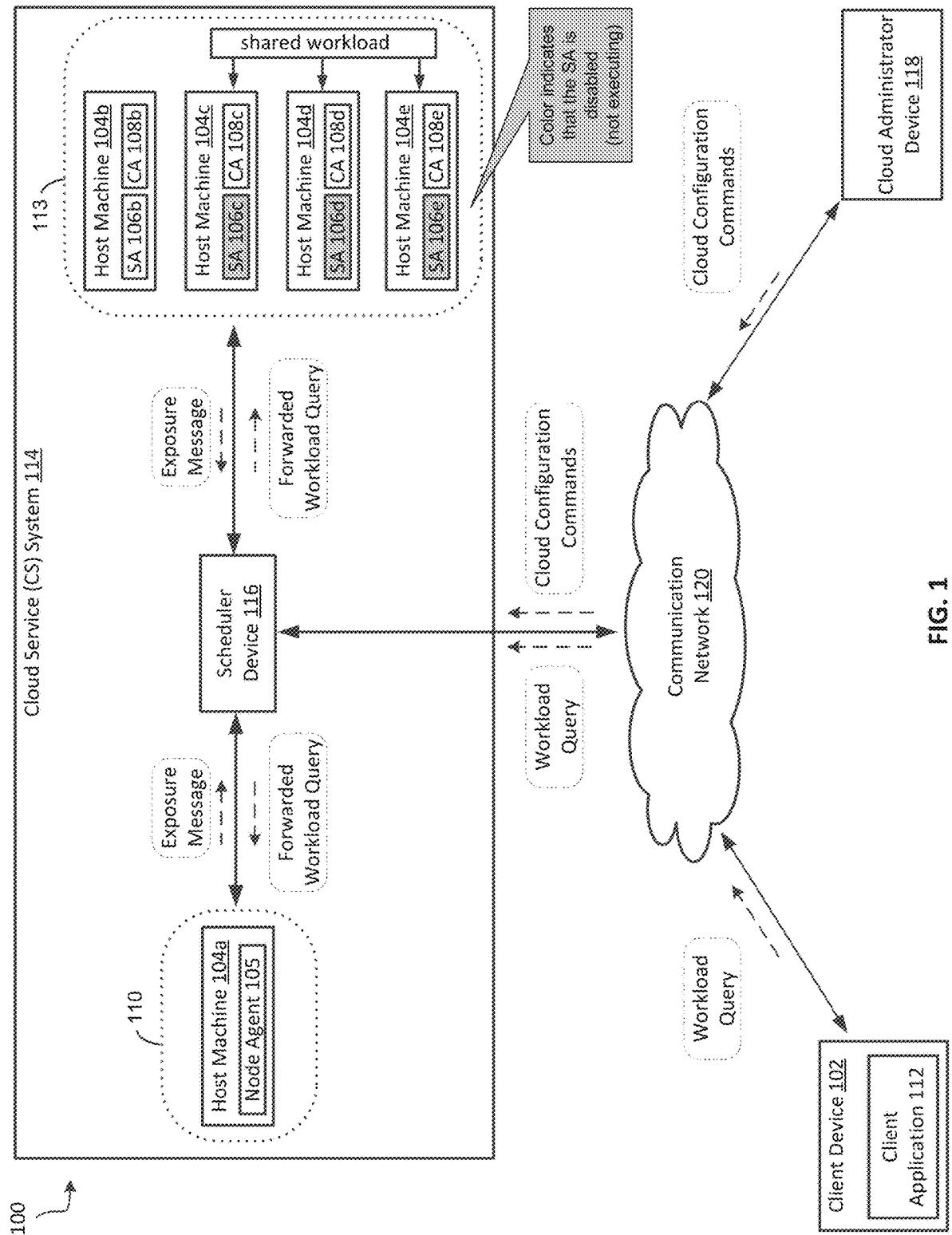
FIG. 1 is a block diagram depicting an example environment for aggregating host machines into a single cloud node for workloads requiring excessive resources, according to some embodiments.

Some workloads/application may require huge amounts of resources (e.g., memory, processing, etc.), that are impossible to obtain from a single host machine in a cloud computing environment. Such workloads usually are distributed applications, meaning that they scale natively when installed on several host machines. For example, a general-purpose distributed memory-caching system (e.g., Memcache) may speed up dynamic database-driven websites by caching data and objects in Random-Access Memory (RAM) to reduce the number of times an external data source (e.g., a database or Application Programming Interface (API)) must be read. While current cloud environments might allow the resource-demanding application to work, the cloud computing environment will require the developer of the application to split the application into multiple workloads (e.g., micro-services) in order to scale. However, that will require more development effort as well as extra administration and configuration in order to implement and deploy the application into the cloud.

Aspects of the present disclosure address the above-noted and other deficiencies by aggregating host machines into a single cloud node for workloads requiring excessive resources. As a result, the developer of the application does not have to split the application into multiple workloads and/or multiple containers. Furthermore, the cloud computing environment does not have to scale resources from other nodes in the cloud computing environment to process the workload, which is a technique that increases network congestion within the cloud computing environment due to the additional messaging (and data transfers) to/from the scaled resources. Accordingly, the embodiments of the present disclosure reduce the amount of networking resources needed to process workloads, as well as, a decrease in network congestion and power consumption for the overall network infrastructure.

As discussed in greater detail below, a cloud service system may provide a plurality of computing devices, where each computing device corresponds to a respective node of a plurality of nodes in the cloud service system. Each computing device may provide one or more resources (e.g., software and/or hardware) for the cloud service system. The cloud service system (or an administrator of the cloud service system) may define an aggregated node that corresponds to at least two computing devices of the plurality of computing devices in the cloud computing system. The aggregated node may expose, to a scheduler device of the cloud service system, an application programming interface (API) that is indicative of the combined resources (e.g., memory, processing, etc.) of the at least two computing devices of the aggregated node. The scheduler device may receive, responsive to receiving the API from the aggregated node, a query to perform a workload requiring a set of resources that exceed the resources provided by each of the computing devices of the cloud service system that sit outside of the aggregated node. The scheduler device may forward the query to the aggregated node to cause the at least two computing devices of the aggregated node to perform the workload using the combined resources of the least two computing devices.

FIG. 1 is a block diagram depicting an example environment for aggregating host machines into a single cloud node for workloads requiring excessive resources, according to some embodiments. The environment 100 includes a cloud service system 114, a client device 102, and a cloud administrator device 118 that are each communicably coupled together via a communication network (not shown in FIG. 1). The client device 102 executes a client application 112 that is configured to send (e.g., provide, transmit, submit) to the cloud service system 114 one or more queries (shown in FIG. 1 as, "Workload Query") to perform one or more workloads. An administrator of the cloud service system 114 may use the cloud administrator device 118 to configure and/or manage (e.g., controls, operates) the cloud service system 114 by sending commands (shown in FIG. 1 as, "Cloud Configuration Commands") to the cloud service system 114. In some embodiments, the client application 112 is included in a single container associated with a Docker platform. In some embodiments, the client application 112 is included in a single Pod associated with a Kubernetes platform.

The communication network 120 may be a public network (e.g., the internet), a private network (e.g., a local area network (LAN) or wide area network (WAN)), or a combination thereof. In some embodiments, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

The cloud service system 114 includes host machines 104a, 104b, 104c, 104d, 104e (collectively referred to as, "host machines 104") and scheduler device 116 that are each communicably connected to one another via the communication network 120 to form a cloud service system for providing services and/or computing resources (collectively referred to as, "services" or "cloud services") to the client device 102, which are used to process the workload queries that are submitted from client application 112. The cloud service system 114 may provide any type of cloud service and/or computing resource including, for example, networking services, block storage services, computing services, object storage services, database services, communication services, deployment and management services, monitoring services, telemetry services, queuing services, collaboration services, application services, and the like.

The cloud service system 114 may be any type of cloud service. In some embodiments, the cloud service may be an Infrastructure-as-a-Service (IaaS) that provides users with compute, networking, and storage resources. In some embodiments, the cloud service may be a Platform-as-a-Service (PaaS) that provides users with a platform on which applications can run, as well as the information technology (IT) infrastructure for it to run. In some embodiments, the cloud service may be a Software-as-a-Service (SaaS) that provides users with a cloud application, the platform on which it runs, and the platform's underlying infrastructure. In some embodiments, the cloud service may be a Function-as-a-Service (FaaS) that is an event-driven execution model that lets the developers build, run, and manage application packages as functions without maintaining the infrastructure.

A host machine 104, a scheduler device 116, a client device 102, and a cloud administrator device may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may comprise a single machine or may include multiple interconnected machines (e.g., multiple servers configured in a cluster).

A host machine 104 may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). The cloud service system 114 may use the same type or different types of virtual environments. For example, all of the host machines 104 may be VMs. In another example, all of the host machines 104 may be containers. In a further example, some of the host machines 104 may be VMs, other host machines 104 may be containers, and other host machines 104 may be computing devices (or groups of computing devices).

Still referring to FIG. 1, the scheduler device 116 is configured to receive a workload query (shown in FIG. 1 as, "Workload Query") from the client application 112 that is executing on the client device 102, determine which node within the cloud service system 114 is able to process the workload queries, and forward (shown in FIG. 1 as, "Forwarded Workload Queries") the workload query to the node that is able to process the workload query. Each node is configured to send a message (shown in FIG. 1 as, "Exposure Message") to the scheduler device 116 to expose an application programming interface (API) to the services and/or resources (e.g., processor, storage, and/or cache memory, etc.) that are provided by the node. The scheduler device 116 determines which node is capable of processing/perform the workload query based on the exposure messages that the scheduler device 116 receives from each of the nodes within the cloud service system 114.

By default, each host machine 104 may be defined as a separate, single node. For example, host machine 104a is defined as a first node (shown in FIG. 1 as, node 110), host machine 104b is defined as a second node, host machine 104c is defined as a third node, host machine 104d is defined as a fourth node, and host machine 104d is defined as a fifth node. In some embodiments, the scheduler device 116 is not aware of the particular host machine(s) 104 that make up each node, but rather, the scheduler device 116 is only aware of which nodes exist within the cloud service system 114.

In some embodiments, the cloud administrator device 118 may generate (e.g., define) a mapping file (e.g., metadata) that includes a plurality of host machine identifiers and a plurality of node identifiers, where each mapping indicates which host machine 104 within the cloud service system 114 corresponds to which respective node of the plurality of nodes. The cloud administrator device 118 may send a cloud configuration command to the scheduler device 116 that includes the mapping file to inform the scheduler device 116 about the nodes within the cloud service system 114.

The cloud administrator device 118 may send a cloud administrator command to each of the host machines 104 to install (e.g., deploy, store, etc.) a node agent 105 on the host machine 104, which is configured with server functionality and client functionality. For example, a first node agent (shown in FIG. 1 as, node agent 105) is installed on host machine 104a, a second node agent is installed on host machine 104b, a third node agent is installed on host machine 104c, a fourth node agent is installed on host machine 104d, and a fifth node agent is installed on host machine 104e.

The cloud administrator may decide to aggregate (e.g., group, cluster) two or more host machines 104 that are within their own respective single nodes into a single, aggregated node that has the combined service and/or resource capabilities of the two or more host machines 104, but where the scheduler device 116 is unaware that the aggregated node corresponds to the two or more host machines 104. For example, the cloud administrator device 118 may generate (e.g., define) a mapping file that indicates that the cloud service system 114 includes a first node (e.g., node 110) and a second node (e.g., aggregated node 113), where node 110 includes host machine 104a and aggregated node 113 includes host machines, 104b, 104c, 104d, 104e. The client administrator may select the host machines 104 to be aggregated into a single, aggregated node by using an application that executes on the cloud administrator device 118.

Upon generating (e.g., defining) an aggregated node, the cloud administrator may split the node agent installed on each host machine 104 of the aggregated node 113 into a server agent, which is configured with the server functionality of the node agent, and a client agent, which is configured with the client functionality of the node agent. For example, as shown in FIG. 1, client administrator device 188 may send a cloud configuration command to the cloud service system 114 to cause the node agent executing on host machines 104b to split into server agent 106b and client agent 108b; the node agent executing on host machines 104c to split into server agent 106c and client agent 108c; the node agent executing on host machines 104d to split into server agent 106d and client agent 108d; and the node agent executing on host machines 104e to split into server agent 106e and client agent 108e. In some embodiments, splitting the node agent 105 be refer to the cloud administrator device 118 sending a cloud configuration command to the cloud service system 114 to install a server agent 106 and a client agent 108 on each of the host machines 104 in aggregated node 113.

In some embodiments, the scheduler device 116 (or another computing device associated with the cloud service system 114) may be configured to determine, based on the cloud configuration commands, which host machines 104 should be aggregated into aggregated node 113, and carry out the procedure to aggregate the host machines 104 according to the determination. In some embodiments, the scheduler device 116 (or another computing device associated with the cloud service system 114) may be configured to send installation commands to each of the host machines 104 to install either a node agent 105 or a server agent 106 and a client agent 108.

The cloud administrator device 118 and/or the cloud service system 114 (e.g., scheduler device 116) may be configured to cause each of the host machines 104 within a single, non-aggregated node (e.g., node 110) to execute (e.g., launch, run) the node agent 105 that was previously installed on the respective host machine 104. For example, the cloud administrator device 118 may send a cloud configuration command to the cloud service system 114 to cause host machine 104a to execute the node agent 105 that was previously installed on the host machine 104a. Alternatively, the scheduler device 116 may be configured to send a command to the host machine 104 to cause the host machine 104a to execute the node agent 105.

The cloud administrator device 118 and/or the cloud service system 114 (e.g., scheduler device 116) may be configured to cause each of the host machines 104 within a single, aggregated node (e.g., aggregated node 113) to execute either the server agent 106 or the client agent 108 that was previously installed on the respective host machine 104. For example, the cloud administrator device 118 may send a cloud configuration command to the cloud service system 114 to cause the host machine 104b to execute the server agent 106b that was previously installed on the host machine 104b, the host machine 104c to execute the client agent 108c that was previously installed on the host machine 104c, the host machine 104d to execute the client agent 108d that was previously installed on the host machine 104d, and the host machine 104e to execute the client agent 108e that was previously installed on the host machine 104. Alternatively, the scheduler device 116 may be configured to send one or more commands to the host machines 104b, 104c, 104d, 104e to cause the host machines 104b, 104c, 104d, 104e to execute either the server agent 106 or the client agent 108.

In some embodiments, the scheduler device 116 prevents more than one host machine 104 in an aggregated node 113 from executing a server agent 106 at a time. For example, scheduler device 116 keeps server agents 106c, 106d, 106d disabled (e.g., not executing) while server agent 10b is enabled (e.g., executing). The grey color in FIG. 1 indicates that a server agent is disabled. In some embodiments, other aggregated nodes (not shown in FIG. 1) within the cloud service system 114 are permitted to execute a single instance of their server agent 106 while server agent 106 of the aggregated node 113 is executing.

Upon being executed, the node agent 105 of node 110 begins (e.g., periodically, when resource availability changes, etc.) sending one or more exposure messages to the scheduler device 116 to expose one or more application programming interface (APIs) to the services and/or resources (e.g., processor, storage, and/or cache memory, etc.) that are provided by host machine 104a. Similarly, upon being executed, the server agent 106b of aggregated node 113 begins (e.g., periodically, when resource availability changes, etc.) sending one or more exposure messages to the scheduler device 116 to expose one or more application programming interface (APIs) to the services and/or resources (e.g., processor, storage, and/or cache memory, etc.) that are provided by host machines 104b, 104c, 104d, 104e.

Now that the cloud service system 114 is configured, the cloud service system 114 is able to provide one or more cloud services and/or resources to one or more client devices. The client application 112 executing on the client device 102 may send a query (e.g., workload query) to process a workload to the scheduler device 116. The scheduler device 166 may determine, based on the APIs exposed from the node 110, that the workload may require a set of resources that exceed the resources provided by node 110. As a result, (1) the developer of client application 112 must first split the client application 112 into multiple workloads and/or multiple containers (e.g., Pods); and/or (2) the cloud service system 114 must scale resources from other nodes in order for the cloud service system 114 to process the workload using one or more nodes, where each node includes only a single host machine 104.

Conversely, the scheduler device 116 may determine, based on the APIs exposed from the aggregated node 113, that the resources provided by aggregated node 113 exceed the set of resources needed to perform the workload. As a result, the developer of client application 112 does not have to split the client application 112 into multiple workloads and/or multiple containers (e.g., Pods), and the cloud service system 114 does not have to scale resources from other nodes of the plurality of nodes in order for the cloud service system 114 to process the workload. In response to determining that the aggregated node 113 is capable of processing/performing the workload, the scheduler device 116 forwards (e.g., sends, redirects) the query to the server agent 106b executing on host machine 104, which causes the server agent 106 to allocate resources from the aggregated node 113 to process/perform the workload. As shown in FIG. 1, a plurality of host machines 104 (e.g., host machines 104c-104e) may share the resource burden of processing the workload.

Although FIG. 1 shows only a select number of computing devices (e.g., host machines 104, client devices 102, and cloud administrator devices 118), the environment 100 may include any number of computing devices that are interconnected in any arrangement to facilitate the exchange of data between the computing devices.

Figure 2B:
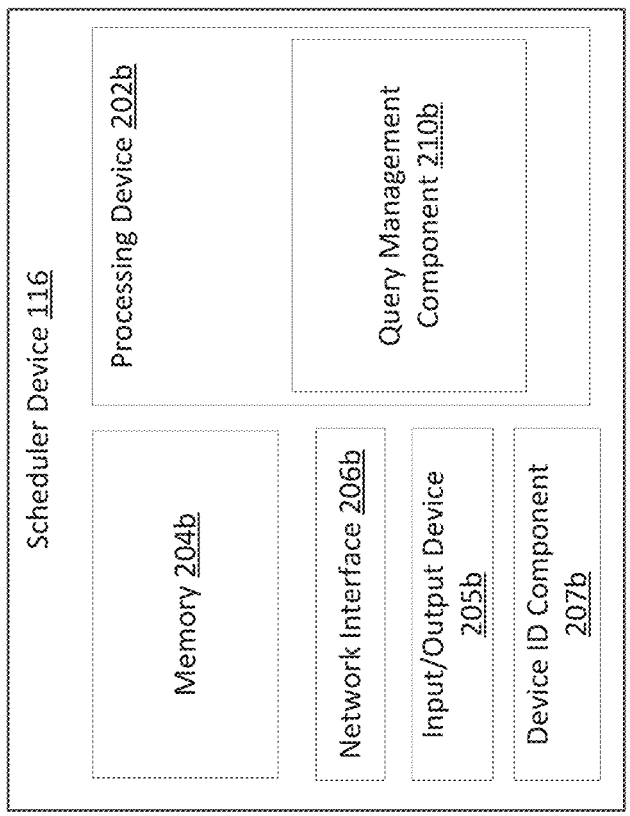
FIG. 2B is a block diagram depicting an example of the scheduler device 116 of the environment in FIG. 1, according to some embodiments.
Figure 2A:
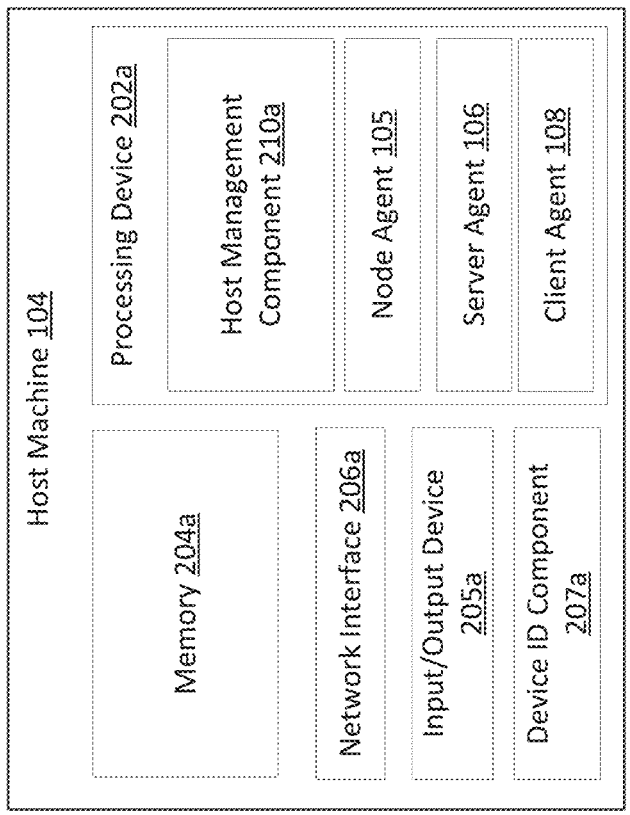
FIG. 2A is a block diagram depicting an example of the host machine 104 in FIG. 1, according to some embodiments.

FIG. 2A is a block diagram depicting an example host machine 104 of the cloud service system 114 in FIG. 1, according to some embodiments. While various devices, interfaces, and logic with particular functionality are shown, it should be understood that the one or more host machines 104 (e.g., host machines 104a-104e) of the cloud service system 114 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The host machine 104 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the host machine 104. In some embodiments, the processing device 202a and the memory 204a form various processing devices and/or circuits described with respect to the host machine 104. The instructions include code from any suitable computer programming language such as, but not limited to, C, C++, C #, Java, JavaScript, VBScript, Perl, HTML, XML, Python, TCL, and Basic.

The processing device 202a may either execute a node agent 105, or a server agent 106 and a client agent 108. In some embodiments, the cloud administrator device 118 and/or the processing device 202a may store the node agent 105, the server agent 107, and the client agent 108 in an internal storage (e.g., memory 204a, database, etc.) of the host machine 104 (e.g., host machine 104b). In some embodiments, the server agent 106 may be configured to perform the server functionality of the node agent 105 in FIG. 1. In some embodiments, the client agent 108 may be configured to perform the client functionality of the node agent 105 in FIG. 1.

The server functionality and the client functionality of the node agent 105 will now be described with respect to the server agent 106 and the client agent 108, respectively.

In some embodiments, the server agent 106 of the aggregated node 113 may be configured to determine (e.g., detect, sense), for each host machine 104 (e.g., host machine 104b-104e) of the aggregated node 113, the set of resources and corresponding APIs that are associated with the host machine 104, and generate a list of APIs associated with the host machines 104 of the aggregated node 113. In other words, the list of APIs may indicate the combined set of resources that are available (e.g., a Ready state) from the host machines 104 of the aggregated node 113.

In some embodiments, the set or resources may correspond to any software and/or hardware component of the host machine 104, such as a processor, memory, a storage device, an adapter (e.g., networking, audio, etc.), one or more ports/interfaces, a video graphics card, a motherboard, and/or the like. In some embodiments, a hardware identifier may identify the type of hardware, the version of the hardware, the model number of the hardware, the brand of the hardware, the specifications for the hardware (e.g., networking speed and/or bandwidth, processor speed, load balancing capabilities, multi-threading capabilities), a count of hardware components (e.g., a count of the processors), and/or the like.

In some embodiments, the server agent 106 may be configured to expose the list of APIs to the scheduler device 116 by sending a message (shown in FIG. 1 as, Exposure Message") to the scheduler device 116, where the message includes the list of APIs. In some embodiments, the exposure message may indicate whether the aggregated node 113 is available and/or has the capability (e.g., not in an error state, etc.) to perform workloads.

In some embodiments, the server agent 106 may be configured to receive a query to perform a workload from the scheduler device 116. In some embodiments, the server agent 106 may be configured to determine that the resources of a different host machine (e.g., host machine 104c) of the aggregated node 113 exceed the set of resources required to perform the workload, and in response, forwarding the query to a client agent 108c executing on the different host machine. In other words, the server agent 106 is able to determine that the different host machine has enough resources to perform the workload without having to share the processing burden with another host machine 104.

In some embodiments, the server agent 106 may be configured to establish a communication layer (e.g., a channel) between the server agent 106 and a client agent (e.g., client agent 108c) executing on the different host machine (e.g., host machine 104c) of the aggregated node 113. In some embodiments, the server agent 106 may be configured to forward (e.g., redirect, send) the query to perform the workload to the client agent (e.g., client agent 108c) executing on the different host machine (e.g., host machine 104c) via the communication layer.

In some embodiments, the server agent 106 may be configured to determine that the set of resources required to perform the workload (as indicated by the query) exceeds the resources of each of the host machines 104 in the aggregated node 113, and in response, forward the query to each of the client agents 108 that are executing on each of the host devices 104 of the aggregated node 113 in order for the workload to be shared across all the host devices 104. For example, the host machine 104c may perform a first portion (e.g., tasks) of the workload of the query using the its resources and host machine 104d may perform a second portion (e.g., tasks) of the workload of the query using the its resources. In some embodiments, the first portion and the second portion may be different portions of the query.

In some embodiments, the server agent 106 may be configured to establish a communication layer between the client agents 108 executing on the host machines 104 of the aggregated node 113 that are sharing the workload, which may be used by the client agents 108 to share information related to the workload.

In some embodiments, the server agent 106 may be configured to determine that the workload is not configured to execute in a distributed environment, and in response, reject the request to perform the workload.

The processing device 202a may execute a host management component 210a that may be configured to receive a cloud administrator command to install (e.g., deploy, store, etc.) the node agent 105, the server agent 106, and/or the client agent 108 onto the host machine 104, and in response, the host management component 210a installs the respective agents onto the host machine 104. In some embodiments, the host management component 210a may be configured to receive a cloud administrator command to execute (e.g., launch, activate) the node agent 105, the server agent 106, and/or the client agent 108 installed on the host machine 104, and in response, the host management component 210a executes the respective agents using the processing device 202a.

The host machine 104 includes a network interface 206a configured to establish a communication session with a computing device for sending and receiving data over the communication network 120 to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the host machine 104 includes a plurality of network interfaces 206a of different types, allowing for connections to a variety of networks, such as local area networks (public or private) or wide area networks including the Internet, via different sub-networks.

The host machine 104 includes an input/output device 205a configured to receive user input from and provide information to a user. In this regard, the input/output device 205a is structured to exchange data, communications, instructions, etc. with an input/output component of the host machine 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the host machine 104, such as a built-in display, touch screen, microphone, etc., or external to the housing of the host machine 104, such as a monitor connected to the host machine 104, a speaker connected to the host machine 104, etc., according to various embodiments. In some embodiments, the host machine 104 includes communication circuitry for facilitating the exchange of data, values, messages, and the like between the input/output device 205a and the components of the host machine 104. In some embodiments, the input/output device 205a includes machine-readable media for facilitating the exchange of information between the input/output device 205a and the components of the host machine 104. In still another embodiment, the input/output device 205a includes any combination of hardware components (e.g., a touchscreen), communication circuitry, and machine-readable media.

The host machine 104 includes a device identification component 207a (shown in FIG. 2A as device ID component 207a) configured to generate and/or manage a device identifier associated with the host machine 104. The device identifier may include any type and form of identification used to distinguish the host machine 104 from other computing devices. In some embodiments, to preserve privacy, the device identifier may be cryptographically generated, encrypted, or otherwise obfuscated by any device and/or component of host machine 104. In some embodiments, the host machine 104 may include the device identifier in any communication (e.g., exposed services) that the host machine 104 sends to a computing device.

The host machine 104 includes a bus (not shown), such as an address/data bus or other communication mechanism for communicating information, which interconnects the devices and/or components of host machine 104, such as processing device 202a, network interface 206a, input/output device 205a, and/or device ID component 207a.

In some embodiments, some or all of the devices and/or components of host machine 104 may be implemented with the processing device 202a. For example, the host machine 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the scheduler device 116 of the environment in FIG. 1, according to some embodiments. While various devices, interfaces, and logic with particular functionality are shown, it should be understood that the scheduler device 116 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The scheduler device 116 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the scheduler device 116 instead of devices and/or components of the host machine 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the scheduler device 116 instead of devices and/or components of the host machine 104.

The processing device 202b may execute a query management component 210b that may be configured to receive a message (shown in FIG. 1 as, Exposure Message") from each node in the cloud service system 114, where the message includes the list of APIs corresponding to the resources provided by each node. In some embodiments, the query management component 210b may be configured to receive a query to perform a workload from the client application 112 executing on the client device 102. In some embodiments, the query management component 210b may be configured to determine, based on the list of APIs, that the workload requires a set of resources that exceed the resources provided node 110, but are less than the resources provided by the aggregated node 113. In some embodiments, the query management component 210b may be configured to determine, based on the API, that the aggregated node 113 is capable to perform the workload using the combined resources of the aggregated node 113 without scaling resources from other nodes of the plurality of nodes. In response to either determination, the query management component 210b forwards the query to the server agent 106 of the aggregated node 113 to aggregated node 113 to perform the workload using the combined resources of the aggregated node 113. In some embodiments, the query to perform a workload corresponds to a single (e.g., non-split) workload.

The scheduler device 116 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the scheduler device 116 instead of devices and/or components of the host machine 104.

The scheduler device 116 includes an input/output device 205b configured to receive user input from and provide information to a user. In this regard, the input/output device 205b is structured to exchange data, communications, instructions, etc. with an input/output component of the scheduler device 116. The input/output device 205b includes identical or nearly identical functionality as input/output device 205a in FIG. 2A, but with respect to devices and/or components of the scheduler device 116 instead of devices and/or components of the host machine 104.

The scheduler device 116 includes a device identification component 207b (shown in FIG. 2B as device ID component 207b) configured to generate and/or manage a device identifier associated with the scheduler device 116. The device ID component 207b includes identical or nearly identical functionality as device ID component 207a in FIG. 2A, but with respect to devices and/or components of the scheduler device 116 instead of devices and/or components of the host machine 104.

The scheduler device 116 includes a bus (not shown), such as an address/data bus or other communication mechanism for communicating information, which interconnects the devices and/or components of the scheduler device 116, such as processing device 202b, network interface 206b, input/output device 205b, device ID component 207b, and the query management component 210b.

In some embodiments, some or all of the devices and/or components of scheduler device 116 may be implemented with the processing device 202b. For example, the scheduler device 116 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

FIG. 3 is a flow diagram depicting a method for aggregating host machines into a single cloud node for workloads requiring excessive resources, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by one or more host machines, such as host machines 104 in FIG. 1. In some embodiments, method 300 may be performed by a cloud service system, such as cloud service system 114 in FIG. 1. In some embodiments, method 300 may be performed by a scheduler device, such as scheduler device 116 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of providing a plurality of computing devices in association with a cloud service system, wherein each computing device corresponds to a respective node of a plurality of nodes, each computing device provides resources for the cloud service system. The method 300 includes the block 304 of defining an aggregated node of the cloud service system corresponding to at least two computing devices of the plurality of computing devices. The method 300 includes the block 306 of exposing, to a scheduler of the cloud service system, an application programming interface (API) that is indicative of combined resources of the at least two computing devices of the plurality of computing devices. The method 300 includes the block 308 of receiving, by the scheduler responsive to receiving the API, a query to perform a workload requiring a set of resources that exceed the resources provided by each of the computing devices of the cloud service system. The method 300 includes the block 308 of forwarding, by the scheduler to the aggregated node, the query to cause the at least two computing devices to perform the workload using the combined resources of the least two computing device.

Figure 4:
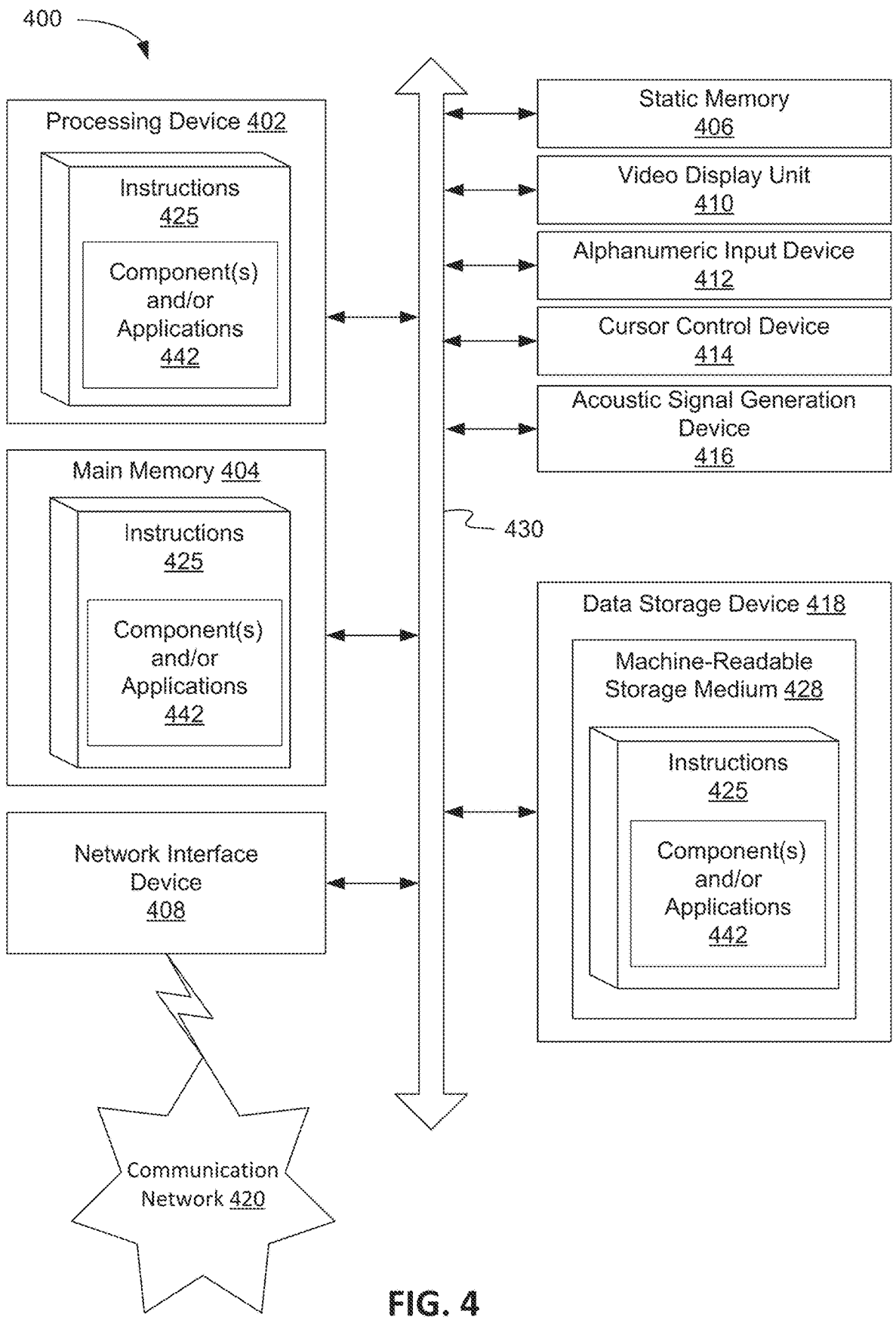
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components and/or applications 442 (e.g., host management component 210a, node agent 105, server agent 106, client agent 108 in FIG. 2A; query management component 210b in FIG. 2B) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "providing," "defining," "exposing," "receiving," "forwarding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
providing a plurality of computing devices in association with a cloud service system, wherein each computing device corresponds to a respective node of a plurality of nodes, each computing device provides resources for the cloud service system;
defining an aggregated node of the cloud service system corresponding to at least two computing devices of the plurality of computing devices;
causing a first server agent to execute on a first computing device of the at least two computing devices corresponding to the aggregated node;
preventing a second server agent that is installed on a second computing device of the at least two computing devices from executing while the first server agent executes on the first computing device, wherein the first server agent and the second server agent have identical server functionality;
exposing, to a scheduler of the cloud service system, an application programming interface (API) that is indicative of combined resources of the at least two computing devices of the plurality of computing devices;
receiving, by the scheduler responsive to receiving the API, a query to perform a workload requiring a set of resources that exceed the resources provided by each of the computing devices of the cloud service system; and
forwarding, by the scheduler to the aggregated node, the query to cause the at least two computing devices to perform the workload using the combined resources of the least two computing device.

2. The method of claim 1, further comprising:
causing, by the cloud service system, a node agent to execute on a different computing device corresponding to a single node of the plurality of nodes, the node agent comprising a server functionality and a client functionality; and
causing, by the cloud service system, a client agent to execute on the second computing device of the at least two computing devices corresponding to the aggregated node, wherein the client agent is configured with the client functionality.

3. The method of claim 2, further comprising:
receiving, by the first server agent executing on the first computing device of the aggregated node, the query to perform the workload;
determining, by the first server agent executing on the first computing device of the aggregated node, that the resources of the second computing device exceed the set of resources required to perform the workload; and
forwarding, by the first server agent executing on the first computing device of the aggregated node to the client agent executing on the second computing device, the query to perform the workload responsive to determining that the second computing device is capable to perform the workload.

4. The method of claim 3, further comprising:
establishing, by the first server agent executing on the first computing device of the aggregated node, a communication layer between the first server agent and the client agent executing on the second computing device, wherein the first server agent forwards the query to perform the workload to the client agent executing on the second computing device via the communication layer.

5. The method of claim 2, further comprising:
causing, by the cloud service system, the second server agent to install on the second computing device of the at least two computing devices corresponding to the aggregated node.

6. The method of claim 2, further comprising:
indicating, by the first server agent executing on the first computing device to the scheduler, an availability to perform workloads.

7. The method of claim 2, further comprising:
determining, by the scheduler based on the API, that the aggregated node is capable to perform the workload using the combined resources of the least two computing device without scaling resources from other nodes of the plurality of nodes.

8. The method of claim 2, wherein the workload corresponds to a single workload.

9. The method of claim 2, wherein the aggregated node of the cloud service system further corresponds to a third computing devices of the plurality of computing devices and further comprising:
- determining, by the first server agent executing on the first computing device of the aggregated node, that the set of resources required to perform the workload exceeds the resources of the second computing device and the resources of the third computing device; and
- forwarding, by the first server agent executing on the first computing device of the aggregated node, the query to perform the workload to the client agent executing on the second computing device and a client agent executing on the third computing device responsive to determining that the set of resources required to perform the workload exceeds the resources of the second computing device and the resources of the third computing device.

10. The method of claim 9, further comprising:
- performing, by the second computing device, a portion of the workload of the query using the resources of the second computing device; and
- performing, by the third computing device, a different portion of the workload of the query using the resources of the third computing device.

11. The method of claim 9, further comprising:
- determining, by the first server agent executing on the first computing device of the aggregated node, that the workload is not configured to execute in a distributed environment; and
- rejecting, by the first server agent executing on the first computing device of the aggregated node, the request to perform the workload.

12. The method of claim 9, further comprising:
- establishing, by the first server agent executing on the first computing device of the aggregated node, a communication layer between the client agent executing on the second computing device and the client agent executing on the third computing device.

13. A cloud service system, comprising:
- a plurality of computing devices, wherein each computing device corresponds to a respective node of a plurality of nodes of the cloud service system, each computing device provides resources for the cloud service system; and
- one or more processor to:
  - define an aggregated node of the cloud service system corresponding to at least two computing devices of the plurality of computing devices;
  - cause a first server agent to execute on a first computing device of the at least two computing devices corresponding to the aggregated node;
  - prevent a second server agent that is installed on a second computing device of the at least two computing devices from executing while the first server agent executes on the first computing device, wherein the first server agent and the second server agent have identical server functionality;
  - expose an application programming interface (API) that is indicative of combined resources of the at least two computing devices of the plurality of computing devices;
  - receive, responsive to receiving the API, a query to perform a workload requiring a set of resources that exceed the resources provided by each of the computing devices of the cloud service system; and
  - forward, to the aggregated node, the query to cause the at least two computing devices to perform the workload using the combined resources of the least two computing device.

14. The cloud service system of claim 13, wherein the one or more processors to:
- cause a node agent to execute on a different computing device corresponding to a single node of the plurality of nodes, the node agent comprising a server functionality and a client functionality; and
- cause a client agent to execute on the second computing device of the at least two computing devices corresponding to the aggregated node, wherein the client agent is configured with the client functionality.

15. The cloud service system of claim 14, wherein the first server agent executing on the first computing device to:
- receive the query to perform the workload;
- determine that the resources of the second computing device exceed the set of resources required to perform the workload; and
- forward, to the client agent executing on the second computing device, the query to perform the workload responsive to determining that the second computing device is capable to perform the workload.

16. The cloud service system of claim 15, wherein the first server agent executing on the first computing device to:
- establish a communication layer between the first server agent and the client agent executing on the second computing device, wherein the first server agent forwards the query to perform the workload to the client agent executing on the second computing device via the communication layer.

17. The cloud service system of claim 14, wherein the one or more processors to:
- cause the second server agent to install on the second computing device of the at least two computing devices corresponding to the aggregated node.

18. The cloud service system of claim 14, wherein the one or more processors to:
- determine, based on the API, that the aggregated node is capable to perform the workload using the combined resources of the least two computing device without scaling resources from other nodes of the plurality of nodes.

19. The cloud service system of claim 14, wherein the aggregated node of the cloud service system further corresponds to a third computing devices of the plurality of computing devices and wherein the first server agent executing on the first computing device to:
- determine that the set of resources required to perform the workload exceeds the resources of the second computing device and the resources of the third computing device; and
- forwarding the query to perform the workload to the client agent executing on the second computing device and a client agent executing on the third computing device responsive to determining that the set of resources required to perform the workload exceeds the resources of the second computing device and the resources of the third computing device.

20. A non-transitory computer-readable medium storing instructions that, when execute by a processing device of a cloud service system, cause the processing device to:
- define an aggregated node of the cloud service system corresponding to at least two computing devices of a plurality of computing devices in association with the cloud service system, wherein each computing device corresponds to a respective node of a plurality of nodes, each computing device provides resources for the cloud service system;

cause a first server agent to execute on a first computing device of the at least two computing devices corresponding to the aggregated node;

prevent a second server agent that is installed on a second computing device of the at least two computing devices from executing while the first server agent executes on the first computing device, wherein the first server agent and the second server agent have identical server functionality;

expose, by the processing device of the cloud service system, an application programming interface (API) that is indicative of combined resources of the at least two computing devices of the plurality of computing devices;

receiving, responsive to receiving the API, a query to perform a workload requiring a set of resources that exceed the resources provided by each of the computing devices of the cloud service system; and forwarding, to the aggregated node, the query to cause the at least two computing devices to perform the workload using the combined resources of the least two computing device.

* * * * *